US012594888B2

(12) United States Patent (10) Patent No.: US 12,594,888 B2

Tanase (45) Date of Patent: Apr. 7, 2026

(54) HITCH ANGLE DETECTION SYSTEM, HITCH ANGLE DETECTION DEVICE, AND NON-TRANSITORY RECORDING MEDIUM

(71) Applicant: TOYOTA JIDOSHA KABUSHIKI KAISHA, Toyota (JP)

(72) Inventor: Noboru Tanase, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/006,382

(22) Filed: Dec. 31, 2024

(65) Prior Publication Data

US 2025/0289368 A1 Sep. 18, 2025

(30) Foreign Application Priority Data

Mar. 14, 2024 (JP) ................................. 2024-040512

(51) Int. Cl.
*B60R 1/26* (2022.01)
*G06T 7/70* (2017.01)
*H04N 7/18* (2006.01)

(52) U.S. Cl.
CPC .................. *B60R 1/26* (2022.01); *G06T 7/70* (2017.01); *H04N 7/183* (2013.01); *G06T 2207/20081* (2013.01); *G06T 2207/20092* (2013.01); *G06T 2207/30252* (2013.01)

(58) Field of Classification Search
CPC .............. B60R 1/26; G06T 7/70; H04N 7/183
See application file for complete search history.

(56) References Cited

U.S. PATENT DOCUMENTS

| | | | |
|---|---|---|---|
| 11,155,298 B2 * | 10/2021 | Niewiadomski | ...... B60W 10/18 |
| 11,358,639 B2 * | 6/2022 | Raeis Hosseiny | . B62D 15/0275 |
| 2018/0319438 A1 | 11/2018 | Herzog | |
| 2022/0297601 A1 * | 9/2022 | Hatzakis | ................... B60R 1/25 |
| 2023/0227104 A1 * | 7/2023 | Pandey | ............... B60W 40/105 |
| | | | 701/17 |
| 2024/0393452 A1 * | 11/2024 | Ghannam | ............... G01S 13/88 |

FOREIGN PATENT DOCUMENTS

| | | |
|---|---|---|
| JP | 2019-509204 A | 4/2019 |
| JP | 7305850 B1 | 7/2023 |

* cited by examiner

*Primary Examiner* — Mishawn N. Hunter
(74) *Attorney, Agent, or Firm* — Oliff PLC

(57) ABSTRACT

A hitch angle detection device detects a trailer hitch angle based on a trailer image shot by a vehicle camera using a model obtained by performing learning using learning data of a learning trailer image shot by a learning vehicle camera and a label indicating learning trailer hitch angle, additional learning of the model is performed in a server by using additional learning data of an additional learning trailer image shot by the vehicle camera and the label indicating the trailer hitch angle when the additional learning trailer image is shot, input of the trailer hitch angle is accepted by a vehicle HMI, the hitch angle detection device detects the trailer hitch angle based on the trailer image shot by the vehicle camera by using the model with the additional learning performed in the server.

3 Claims, 3 Drawing Sheets

HITCH ANGLE DETECTION SYSTEM, HITCH ANGLE DETECTION DEVICE, AND NON-TRANSITORY RECORDING MEDIUM

FIELD

The present disclosure relates to hitch angle detection system, hitch angle detection device, and non-transitory recording medium.

BACKGROUND

PTL 1 (JP-A-2019-509204) discloses a technique in which a plurality of distances and a plurality of reference points associated with shape of vehicle and trailer are learned based on camera input, a plurality of reference distances associated with a plurality of reference points are calculated, a current hitch angle is calculated by using a plurality of reference distances and shape distances.

A technique of attaching a mechanical sensor to the trailer to measure the hitch angle is also conceivable, but because of cost, the trouble of attaching the sensor to each individual trailer owned by the user, the hitch angle may be detected using an image of the rear camera of the vehicle towing the trailer. A technique of attaching a characteristic marker to the trailer when the hitch angle is detected using an image is also conceivable. However, similarly to the technique of attaching the mechanical sensor to the trailer, there is a trouble in performing setting for detecting (calculating) the hitch angle by attaching the marker to each trailer. A technique is also conceivable in which a model is learned by using the image of the trailer in which labeling of an angle value (or similar) is performed as learning data without using a special characteristic marker or the like, and a hitch angle is detected by using a learned model.

However, since there are many types of trailers in the market, trying to prepare learning data for all types of trailers results in an excessive load on preparing learning data, which makes realization difficult. Therefore, we are forced to prepare learning data using a typical type of trailer, perform learning of a model using the learning data, and detect a hitch angle using the learned model.

However, when the learning of the model is performed using the learning data prepared by using the typical type of trailer and the hitch angle is detected by using the learned model, it is a reality that the detection accuracy of the hitch angle of, for example, a trailer having a characteristic design, a trailer in which appearance is customized by the user or the like cannot be sufficiently improved.

For example, a technique capable of sufficiently improving the detection accuracy of the hitch angle of the trailer having the characteristic design or the like while suppressing an increase in the load to prepare the learning data is desired.

SUMMARY

In view of the above-described points, it is an object of the present disclosure to provide hitch angle detection system, hitch angle detection device, and non-transitory recording medium that can appropriately improve the detection accuracy of a hitch angle of a trailer, for example, having a characteristic design or the like while suppressing an increase in a load for preparing learning data.

(1) One aspect of the present disclosure is a hitch angle detection system including: a trailer; a vehicle towing the trailer; a camera mounted on the vehicle; a hitch angle detection device detecting a hitch angle of the trailer based on an image of the trailer shot by the camera mounted on the vehicle by using a model obtained by performing learning using learning data which is a data set of the image of a learning trailer shot by a learning camera mounted on a learning vehicle and a label indicating the hitch angle of the learning trailer; and a server performing additional learning of the model, wherein the vehicle includes HMI accepting input of the hitch angle of the trailer used for the additional learning of the model and communication device communicating with the server, the camera mounted on the vehicle shoots an additional learning image of the trailer used for the additional learning of the model, the HMI accepts the input of the hitch angle of the trailer when the additional learning image of the trailer is shot, the server performs the additional learning of the model by using additional learning data which is the data set of the additional learning image of the trailer and the label indicating the hitch angle of the trailer, the input of the hitch angle of the trailer is accepted by the HMI, the hitch angle detection device detects the hitch angle of the trailer based on the image of the trailer shot by the camera mounted on the vehicle by using the model with the additional learning performed in the server.

(2) Another aspect of the present disclosure is a hitch angle detection device including a processor configured to detect a hitch angle of a trailer towed by a vehicle based on an image of the trailer shot by a camera mounted on the vehicle by using a model obtained by performing learning using learning data which is a data set of the image of a learning trailer shot by a learning camera mounted on a learning vehicle and a label indicating the hitch angle of the learning trailer, wherein additional learning of the model is performed in a server communicating with a communication device mounted on the vehicle, by using additional learning data which is the data set of an additional learning image of the trailer shot by the camera mounted on the vehicle and the label indicating the hitch angle of the trailer when the additional learning image of the trailer is shot, the input of the hitch angle of the trailer is accepted by an HMI mounted on the vehicle, the processor is configured to detect the hitch angle of the trailer based on the image of the trailer shot by the camera mounted on the vehicle by using the model with the additional learning performed in the server.

(3) Another aspect of the present disclosure is a non-transitory recording medium having recorded thereon a computer program for causing a processor to perform a process which is configured to detect a hitch angle of a trailer based on an image of the trailer towed by a vehicle shot by a camera mounted on the vehicle by using a model obtained by performing learning using learning data which is a data set of the image of a learning trailer shot by a learning camera mounted on a learning vehicle and a label indicating the hitch angle of the learning trailer, including: acquiring the model with additional learning performed in a server using additional learning data which is the data set of an additional learning image of the trailer shot by the camera mounted on the vehicle and the label indicating the hitch angle of the trailer when the additional learning image of the trailer is shot, input of the hitch angle of the trailer being accepted by an HMI mounted on the vehicle; and detecting the hitch angle of the trailer based on the image of the trailer shot by the camera mounted on the vehicle by using the model with the additional learning performed in the server, wherein the server communicates with a communication device mounted on the vehicle.

According to the present disclosure, it is possible to appropriately improve the detection accuracy of a hitch angle of a trailer, for example, having a characteristic design or the like while suppressing an increase in a load for preparing learning data.

BRIEF DESCRIPTION OF DRAWINGS

FIG. 2 is a view showing an example of a hitch angle detection system SY including the vehicle 1 shown in FIG. 1, trailer SY1 towed by the vehicle 1, server SY2 and the like.

DESCRIPTION OF EMBODIMENTS

Figure 1:
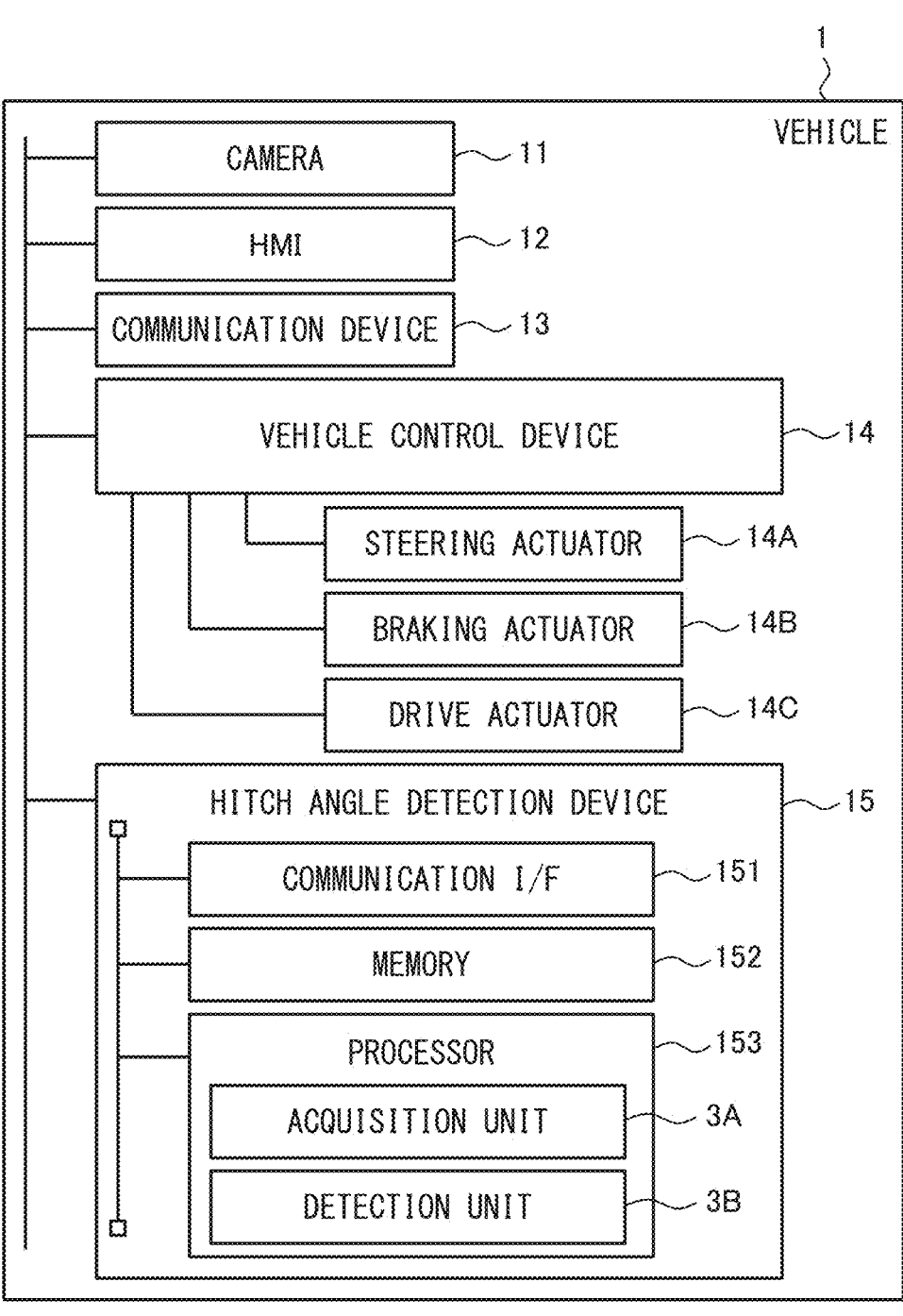
FIG. 1 is a view showing an example of a vehicle 1 to which a hitch angle detection device 15 of a first embodiment is applied.

Below, referring to the drawings, embodiments of hitch angle detection system, hitch angle detection device, and non-transitory recording medium of the present disclosure will be explained.

First Embodiment

FIG. 1 is a view showing an example of a vehicle 1 to which a hitch angle detection device 15 of a first embodiment is applied.

In the example shown in FIG. 1, the vehicle 1 includes camera 11, HMI (Human Machine Interface) 12, communication device 13, vehicle control device 14, steering actuator 14A, braking actuator 14B, drive actuator 14C, and the hitch angle detection device 15.

The camera 11 is disposed at rear portion of the vehicle 1, for example. The camera 11 shoots the rear of the vehicle 1 and transmits an image (for example, fisheye lens image or the like) including a trailer SY1 (refer to FIG. 2) towed by the vehicle 1 to the hitch angle detection device 15.

The HMI 12 has the function of receiving various operations of a driver of the vehicle 1 and the like, and transmits signals indicating the operations of the driver of the vehicle 1 to the vehicle control device 14.

The communication device 13 communicates with the outside of the vehicle 1 (for example, server SY2 (refer to FIG. 2) or the like).

Figure 2:
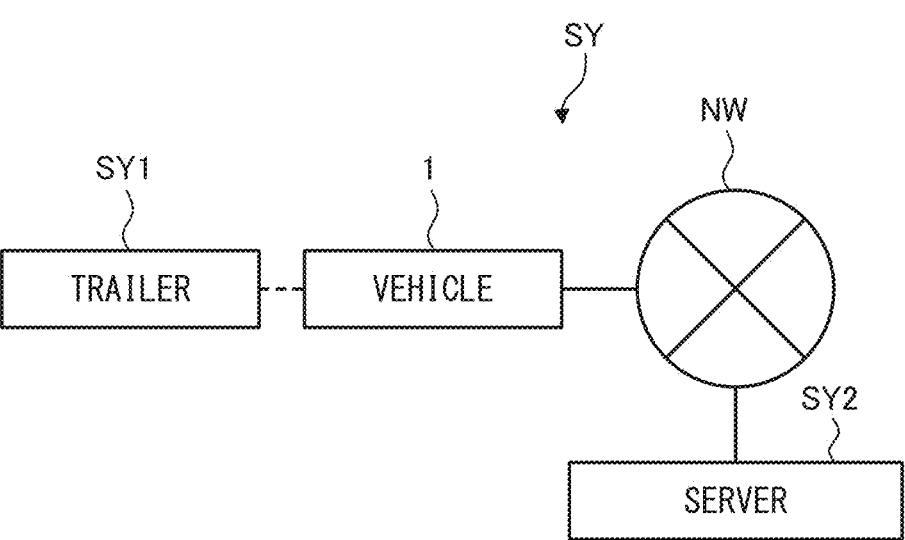

FIG. 2 is a view showing an example of a hitch angle detection system SY including the vehicle 1 shown in FIG. 1, trailer SY1 towed by the vehicle 1, server SY2 and the like.

In the example shown in FIG. 2, the hitch angle detection system SY is configured by the vehicle 1, the trailer SY1 towed by the vehicle 1, the server SY2, and the like. The (communication device 13 of the) vehicle 1 and the server SY2 are configured to be communicable through a network NW. The server SY2 performs learning using learning data which is a data set of the image of a learning trailer (not shown) shot by a learning camera (not shown) mounted on a learning vehicle (not shown) and a label indicating the hitch angle of the learning trailer in order to obtain a model which is used when the hitch angle detection device 15 detects (infers) the hitch angle of the trailer SY1. In addition, the server SY2 transmits the learned model to the vehicle 1 via the networked NW.

In another example, the learning using the learning data which is the data set of the image of the learning trailer shot by the learning camera mounted on the learning vehicle and the label indicating the hitch angle of the learning trailer may be performed at a location other than the server SY2 (for example, a manufacturing plant of the hitch angle detection device 15) in order to obtain the model which is used when the hitch angle detection device 15 detects (infers) the hitch angle of the trailer SY1. In this example, when the hitch angle detection device 15 is incorporated into the vehicle 1, the learned model is incorporated into the vehicle 1.

In the example shown in FIG. 1 and FIG. 2, the communication device 13 receives the learned model transmitted from the server SY2.

The vehicle control device 14 controls the steering actuator 14A, the braking actuator 14B, and the drive actuator 14C based on the signals transmitted from the HMI 12 and the like.

The hitch angle detection device 15 is configured by a microcomputer including communication interface (I/F) 151, memory 152, and processor 153. The communication interface 151 includes an interface circuit for connecting the hitch angle detection device 15 to the camera 11, the HMI 12, the communication device 13, and the vehicle control device 14. The memory 152 stores a program used in a process performed by the processor 153 and various data. The processor 153 has the function as an acquisition unit 3A and the function as a detection unit 3B.

In the example shown in FIG. 1 and FIG. 2, the acquisition unit 3A acquires the learned model whose learning is performed in the server SY2. Specifically, the acquisition unit 3A acquires the learned model which is received by the communication device 13.

In another example described above (example in which the learned model is incorporated in the vehicle 1 when the hitch angle detection device 15 is incorporated in the vehicle 1), the learned model is stored in the memory 152 and incorporated in advance in the hitch angle detection device 15, and the acquisition unit 3A acquires the learned model from the memory 152.

In the example shown in FIG. 1 and FIG. 2, the acquisition unit 3A acquires the image of the trailer SY1 shot by the camera 11 (image of the trailer SY1 transmitted from the camera 11).

The detection unit 3B detects (infers) the hitch angle of the trailer SY1 based on the image of the trailer SY1 shot by the camera 11 by using the learned model acquired by the acquisition unit 3A.

The hitch angle of the trailer SY1 detected by the detection unit 3B is used by the driver of the vehicle 1, the vehicle control device 14, or the like, for example, at the time of the backward control of the vehicle 1 and the trailer SY1, the lane keep control of the vehicle 1 and the trailer SY1 is performed, or the like.

As mentioned above, there are many types of trailers in the market. Therefore, when the trailer SY1 is, for example, the trailer having the characteristic design, the trailer with the customized appearance by the user, or the like (and when the learning trailer is not such trailer), the hitch angle of the trailer SY1 may not be detected (inferred) with high accuracy by using the learned model whose learning is performed by using the learning data which is the data set of the image of the learning trailer and the label indicating the hitch angle of the learning trailer.

Therefore, in the example shown in FIG. 1 and FIG. 2, additional learning of the learned model is performed at such a time.

Specifically, in the example shown in FIG. 1 and FIG. 2, the camera 11 shoots an additional learning image of the trailer SY1 used for the additional learning of the learned model and transmits the additional learning image of the trailer SY1 to the communication device 13.

The HMI 12 accepts input of the hitch angle of the trailer SY1 (measured, for example, by the user) when the additional learning image of the trailer SY1 is shot and transmits the hitch angle of the trailer SY1 when the additional learning image of the trailer SY1 is shot to the communication device 13.

More specifically, the hitch angle of the trailer SY1 is changed multiple times. Every time the hitch angle of the trailer SY1 is changed, the additional learning image of the trailer SY1 is shot and the input of the hitch angle of the trailer SY1 when the additional learning image of the trailer SY1 is shot is performed. This is to improve the performance of the model after additional learning is performed.

The communication device 13 transmits the set of the additional learning image of the trailer SY1 shot by the camera 11 and the hitch angle of the trailer SY1 whose input is accepted by the HMI 12 through the network NW to the server SY2.

The server SY2 performs the additional learning of the learned model by using additional learning data which is the data set of the additional learning image of the trailer SY1 shot by the camera 11 and the label indicating the hitch angle of the trailer SY1 whose input is accepted by the HMI 12. In addition, the server SY2 transmits the model with the additional learning to the vehicle 1 via the networked NW.

The communication device 13 receives the model with the additional learning sent from the server SY2.

The acquisition unit 3A acquires the model with the additional learning performed in the server SY2. Specifically, the acquisition unit 3A acquires the model with the additional learning performed which is received by the communication device 13.

The camera 11 shoots the image of the trailer SY1 used for the detection (inference) of the hitch angle of the trailer SY1 performed by the detection unit 3B by using the model with the additional learning performed, and transmits the image of the trailer SY1 to the hitch angle detection device 15.

The acquisition unit 3A acquires the image of the trailer SY1 shot by the camera 11 (the image of the trailer SY1 used for the detection (inference) of the hitch angle of the trailer SY1 by using the model with the additional learning performed).

The detection unit 3B detects (infers) the hitch angle of the trailer SY1 based on the image of the trailer SY1 shot by the camera 11 by using the model with the additional learning performed acquired by the acquisition unit 3A.

Therefore, in the example shown in FIG. 1 and FIG. 2, it is possible to sufficiently improve the detection accuracy of the hitch angle of the trailer SY1 while suppressing an increase in a load for preparing the learning data (specifically, the learning data which is the data set of the image of the learning trailer and the label indicating the hitch angle of the learning trailer) even if the trailer SY1 is the trailer having the characteristic design or the like.

That is, in the example shown in FIG. 1 and FIG. 2, the user of the trailer SY1 (the driver of the vehicle 1) first tries to cause the detection unit 3B to detect the hitch angle of the trailer SY1 by using the learned model obtained by performing the learning using the learning data which is the data set of the image of the learning trailer and the label indicating the hitch angle of the learning trailer. Then, when the detection performance of the hitch angle of the trailer SY1 by the detection unit 3B using the learned model is insufficient, the user of the trailer SY1 causes the camera 11 to shoot the additional learning image of the trailer SY1, measures the hitch angle of the trailer when the additional learning image is shot, and inputs the measurement result of the hitch angle of the trailer SY1 through the HMI 12.

Consequently, as described above, the additional learning of the learned model using the additional learning data which is the data set of the additional learning image of the trailer SY1 shot by the camera 11 and the label indicating the hitch angle of the trailer SY1 whose input is accepted by the HMI 12 is performed in the server SY2.

In addition, as described above, the detection unit 3B detects (infers) the hitch angle of the trailer SY1 based on the image of the trailer SY1 shot by the camera 11 by using the model with the additional learning performed in the server SY2.

As a result, the user of the trailer SY1 can obtain a highly accurate detection result of the hitch angle of the trailer SY1, even if the trailer SY1 is, for example, the trailer having the characteristic design or the like.

Figure 3:
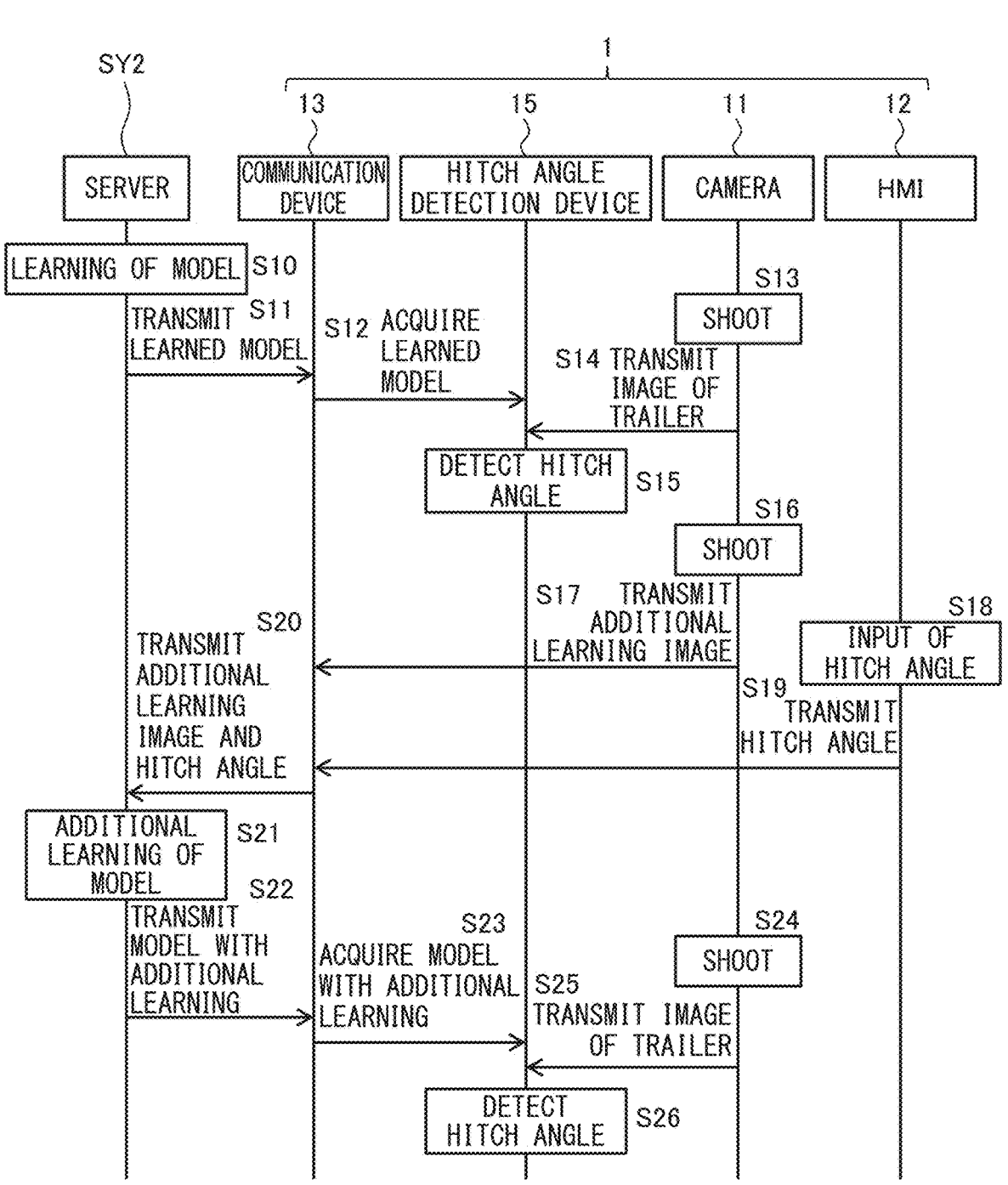
FIG. 3 is a sequence diagram for explaining an example of a process performed in the hitch angle detection system SY including the vehicle 1 to which the hitch angle detection device 15 of the first embodiment is applied when additional learning of the model is performed.

FIG. 3 is a sequence diagram for explaining an example of a process performed in the hitch angle detection system SY including the vehicle 1 to which the hitch angle detection device 15 of the first embodiment is applied when additional learning of the model is performed.

In the example shown in FIG. 3, at step S10, the server SY2 performs the learning of the model used to detect (infer) the hitch angle of the trailer SY1 at step S15 by using the learning data which is the data set of the image of the learning trailer shot by the learning camera mounted on the learning vehicle and the label indicating the hitch angle of the learning trailer.

At step S11, the server SY2 transmits the learned model (model with the learning performed at step S10) to the vehicle 1 via the networked NW, and the communication device 13 of the vehicle 1 receives the learned model.

At step S12, the acquisition unit 3A acquires the learned model from the communication device 13.

At step S13, the camera 11 shoots the image of the trailer SY1 used to detect (infer) the hitch angle of the trailer SY1 at step S15.

At step S14, the camera 11 transmits the image of the trailer SY1 to the hitch angle detection device 15, and the acquisition unit 3A acquires the image of the trailer SY1.

At step S15, the detection unit 3B detects (infers) the hitch angle of the trailer SY1 based on the image of the trailer SY1 acquired at step S14 (image of the trailer SY1 shot at step S13) by using the learned model acquired at step S12.

In the example shown in FIG. 3, step S15 is performed when the user of the trailer SY1 (the driver of the vehicle 1) is actually using the trailer SY1, and since the user wants to improve the performance of the hitch angle detection device 15 (e.g., the user does not satisfy the detection (inference) result of the hitch angle of the trailer SY1 at step S15), the process after the step S16 is performed.

At step S16, the camera 11 shoots the additional learning image of the trailer SY1 used for the additional learning of the learned model at step S21.

At step S17, the camera 11 transmits the additional learning image of the trailer SY1 to the communication device 13.

At step S18, the HMI 12 accepts the input (input by the user) of the hitch angle of the trailer SY1 when the additional learning image of the trailer SY1 is shot.

At step S19, the HMI 12 transmits the hitch angle of the trailer SY1 when the additional learning image of the trailer SY1 is shot (hitch angle of the trailer SY1 whose input is accepted by the HMI 12 received the input at step S18) to the communication device 13.

As described above, the hitch angle of the trailer SY1 is changed multiple times. Every time the hitch angle of the trailer SY1 is changed, the additional learning image of the trailer SY1 is shot at step S16 and the input of the hitch angle of the trailer SY1 when the additional learning image of the trailer SY1 is shot is performed at step S18.

At step S20, the communication device 13 transmits a set of the additional learning image of the trailer SY1 shot at step S16 (additional learning image of the trailer SY1 transmitted from the camera 11 at step S17) and the hitch angle of the trailer SY1 whose input is accepted by the HMI 12 at step S18 (hitch angle of the trailer SY1 transmitted from the HMI 12 at step S19) to the server SY2 via the network NW.

At step S21, the server SY2 performs the additional learning of the learned model by using the additional learning data which is the data set of the additional learning image of the trailer SY1 shot at step S16 (additional learning image of the trailer SY1 transmitted from the communication device 13 at step S20) and the label indicating the hitch angle of the trailer SY1 whose input is accepted by the HMI 12 at step S18 (hitch angle of the trailer SY1 transmitted from the communication device 13 at step S20).

At step S22, the server SY2 transmits the model with the additional learning performed (model with the additional learning performed at step S21) to the vehicle 1 via the networked NW, and the communication device 13 of the vehicle 1 receives the model with the additional learning performed.

At step S23, the acquisition unit 3A acquires the model with the additional learning performed from the communication device 13.

At step S24, the camera 11 shoots the image of the trailer SY1 used to detect (infer) the hitch angle of the trailer SY1 at step S26.

At step S25, the camera 11 transmits the image of the trailer SY1 shot at step S24 to the hitch angle detection device 15, and the acquisition unit 3A acquires the image of the trailer SY1.

At step S26, the detection unit 3B detects (infers) the hitch angle of the trailer SY1 based on the image of the trailer SY1 acquired at step S25 (image of the trailer SY1 shot at step S24) by using the model with the additional learning performed acquired at step S23.

Second Embodiment

The vehicle 1 to which the hitch angle detection device 15 of a second embodiment is applied is configured similarly to the vehicle 1 to which the hitch angle detection device 15 of the first embodiment described above is applied, except for the points to be described later.

In the example (example shown in FIG. 3) of the hitch angle detection system SY including the vehicle 1 to which the hitch angle detection device 15 of the first embodiment is applied as described above, step S15 of FIG. 3 (detection (inference) of the hitch angle of the trailer SY1) is performed when the user (driver of the vehicle 1) of the trailer SY1 is actually using the trailer SY1, and the process after step S16 of FIG. 3 is performed when the user wishes to improve the performance (detection performance of the hitch angle of the trailer SY1) of the hitch angle detection device 15.

Meanwhile, in an example of the hitch angle detection system SY including the vehicle 1 to which the hitch angle detection device 15 of the second embodiment is applied, step S15 of FIG. 3 (detection (inference) of the hitch angle of the trailer SY1) is performed when the calibration travel is performed before the user of the trailer SY1 starts using the trailer SY1, and the process after step S16 of FIG. 3 is performed when the user wishes to improve the performance (detection performance of the hitch angle of the trailer SY1) of the hitch angle detection device 15.

As described above, although the embodiments of the hitch angle detection system, the hitch angle detection device, and the non-transitory recording medium of the present disclosure have been described with reference to the drawings, the hitch angle detection system, the hitch angle detection device, and the non-transitory recording medium of the present disclosure are not limited to the embodiments described above, and may be appropriately changed without departing from the scope of the present disclosure. The configuration of each example of the embodiment described above may be appropriately combined. In each example of the above-described embodiment, the process performed in the hitch angle detection device 15 has been described as software process performed by executing the program, but the process performed in the hitch angle detection device 15 may be process performed by hardware. Alternatively, the process performed by the hitch angle detection device 15 may be a combination of both software and hardware. Further, the program (program for realizing the function of the processor 153 of the hitch angle detection device 15) stored in the memory 152 of the hitch angle detection device 15 may be recorded in a computer-readable storage medium (non-transitory recording medium) such as, semiconductor memory, magnetic recording medium, optical recording medium, or the like for providing, distribution or the like.

The invention claimed is:

1. A hitch angle detection system including:
a trailer;
a vehicle towing the trailer;
a camera mounted on the vehicle;
a hitch angle detection device detecting a hitch angle of the trailer based on an image of the trailer shot by the camera mounted on the vehicle by using a model obtained by performing learning using learning data which is a data set of the image of a learning trailer shot by a learning camera mounted on a learning vehicle and a label indicating the hitch angle of the learning trailer; and
a server performing additional learning of the model, wherein
the vehicle includes HMI accepting input of the hitch angle of the trailer used for the additional learning of the model and communication device communicating with the server,
the camera mounted on the vehicle shoots an additional learning image of the trailer used for the additional learning of the model,
the HMI accepts the input of the hitch angle of the trailer when the additional learning image of the trailer is shot,
the server performs the additional learning of the model by using additional learning data which is the data set of the additional learning image of the trailer and the label indicating the hitch angle of the trailer, the input of the hitch angle of the trailer is accepted by the HMI, the hitch angle detection device detects the hitch angle of the trailer based on the image of the trailer shot by the camera mounted on the vehicle by using the model with the additional learning performed in the server.

2. A hitch angle detection device comprising a processor configured to detect a hitch angle of a trailer towed by a vehicle based on an image of the trailer shot by a camera mounted on the vehicle by using a model obtained by performing learning using learning data which is a data set of the image of a learning trailer shot by a learning camera mounted on a learning vehicle and a label indicating the hitch angle of the learning trailer, wherein additional learning of the model is performed in a server communicating with a communication device mounted on the vehicle, by using additional learning data which is the data set of an additional learning image of the trailer shot by the camera mounted on the vehicle and the label indicating the hitch angle of the trailer when the additional learning image of the trailer is shot, the input of the hitch angle of the trailer is accepted by an HMI mounted on the vehicle, the processor is configured to detect the hitch angle of the trailer based on the image of the trailer shot by the camera mounted on the vehicle by using the model with the additional learning performed in the server.

3. A non-transitory recording medium having recorded thereon a computer program for causing a processor to perform a process which is configured to detect a hitch angle of a trailer based on an image of the trailer towed by a vehicle shot by a camera mounted on the vehicle by using a model obtained by performing learning using learning data which is a data set of the image of a learning trailer shot by a learning camera mounted on a learning vehicle and a label indicating the hitch angle of the learning trailer, comprising:

acquiring the model with additional learning performed in a server using additional learning data which is the data set of an additional learning image of the trailer shot by the camera mounted on the vehicle and the label indicating the hitch angle of the trailer when the additional learning image of the trailer is shot, input of the hitch angle of the trailer being accepted by an HMI mounted on the vehicle: and detecting the hitch angle of the trailer based on the image of the trailer shot by the camera mounted on the vehicle by using the model with the additional learning performed in the server, wherein the server communicates with a communication device mounted on the vehicle.

* * * * *